United States Patent
Kreling et al.

(10) Patent No.: US 9,151,880 B2
(45) Date of Patent: Oct. 6, 2015

(54) MIRROR HAVING REFLECTIVE LAYER OF OR INCLUDING SILICON ALUMINUM

(71) Applicant: Guardian Industries Corp, Auburn Hills, MI (US)

(72) Inventors: Afonso Kreling, Rio de Janeiro (BR); Fabiola Ramos Torres, Rio de Janeiro (BR); Juan Baillo Abreu, Sao Paulo (BR); Willem Den Boer, Brighton, MI (US); Alexey Krasnov, Canton, MI (US)

(73) Assignees: Guardian do Brasil Vidros Planos Ltda., Rio de Janeiro (BR); Guardian Industries Corp., Auburn Hills, MI (US)

( * ) Notice: Subject to any disclaimer, the term of this patent is extended or adjusted under 35 U.S.C. 154(b) by 240 days.

(21) Appl. No.: 13/770,262

(22) Filed: Feb. 19, 2013

(65) Prior Publication Data
US 2014/0233120 A1 Aug. 21, 2014

(51) Int. Cl.
*G02B 5/08* (2006.01)

(52) U.S. Cl.
CPC .............. *G02B 5/0858* (2013.01); *G02B 5/0866* (2013.01)

(58) Field of Classification Search
CPC .. G02B 5/0858; G02B 5/0808; G02B 5/0833; G02B 5/0825; G02B 5/085; G02B 5/08; B60R 1/08
USPC .......... 359/849, 838, 839, 871, 604, 883, 884
See application file for complete search history.

(56) References Cited

U.S. PATENT DOCUMENTS

| | | | |
|---|---|---|---|
| 6,530,668 B2 | 3/2003 | Krisko | |
| 6,783,253 B2 | 8/2004 | Thomsen et al. | |
| 6,934,085 B2 | 8/2005 | Stachowiak et al. | |
| 7,276,289 B2 | 10/2007 | Lu et al. | |
| 7,678,459 B2 | 3/2010 | Scott et al. | |
| 8,173,263 B2 | 5/2012 | Lingle et al. | |
| 8,187,713 B2 | 5/2012 | Lemmer et al. | |
| 2006/0077580 A1 | 4/2006 | Wuillaume et al. | |
| 2007/0178316 A1 | 8/2007 | Mellott | |
| 2008/0055704 A1 | 3/2008 | Neidrich et al. | |
| 2008/0073203 A1 | 3/2008 | Wang et al. | |
| 2008/0164173 A1 | 7/2008 | Savakus | |

(Continued)

FOREIGN PATENT DOCUMENTS

| | | |
|---|---|---|
| DE | 10 2009 040 785 | 3/2011 |
| DE | 10 2010 039 927 | 3/2012 |
| JP | 11-238574 | 8/1999 |

OTHER PUBLICATIONS

"Reliability Implications of Nitrogen Contamination During Deposition of Sputtered Aluminum/Silicon Metal Films"; Klema et al., Reliability Physics Symposium, 22$^{nd}$ Annual IEEE; Apr. 1, 1984.

(Continued)

*Primary Examiner* — Euncha Cherry
(74) *Attorney, Agent, or Firm* — Nixon & Vanderhye P.C.

(57) ABSTRACT

Embodiments relate to mirrors having a reflective layer of or including silicon aluminum (e.g., SiAl). The mirrors may be first surface mirrors, or second surface mirrors. The SiAl layer may be provided between dielectric layers. The mirrors may be flat or bent in different instances, and may or may not be heat treated. In certain example instances, such mirrors may be used in interior residential, commercial, appliance, and/or other applications.

20 Claims, 2 Drawing Sheets

(56) References Cited

U.S. PATENT DOCUMENTS

| | | | |
|---|---|---|---|
| 2008/0212189 A1* | 9/2008 | Baur et al. | 359/604 |
| 2010/0229853 A1 | 9/2010 | Vandal et al. | |
| 2010/0259940 A1 | 10/2010 | Chiang et al. | |
| 2011/0176212 A1 | 7/2011 | Lu et al. | |
| 2011/0176236 A1 | 7/2011 | Lu et al. | |

OTHER PUBLICATIONS

U.S. Appl. No. 13/770,364, filed Feb. 19, 2013; Kreling et al.
International Search Report mailed May 9, 2014.

* cited by examiner

| Color | Color AC | Color HT |
|---|---|---|
| Tr Y% | 24.9 | 30.7 |
| Tr a* | 2.5 | 3.5 |
| Tr b* | 12.3 | 17.1 |
| Rg Y% | 44.2 | 49.2 |
| Rg a* | -2.2 | -2.9 |
| Rg b* | 2.1 | 1.7 |
| Rf Y% | 51.7 | 54.3 |
| Rf a* | -1.6 | -2.4 |
| Rf b* | 1.5 | 0.3 |

MIRROR HAVING REFLECTIVE LAYER OF OR INCLUDING SILICON ALUMINUM

FIELD OF THE INVENTION

Certain example embodiments of this invention relate to mirrors and/or methods of making the same. More particularly, certain example embodiments relate to mirrors having a reflective layer of or including silicon aluminum. The mirrors may be first surface mirrors, or second surface mirrors. The mirrors may be flat or bent in different instances, and may or may not be heat treated (e.g., thermally tempered and/or thermally bent). In certain example instances, such mirrors may be used in interior residential, commercial, furniture, appliance, and/or other applications.

BACKGROUND AND SUMMARY OF EXAMPLE EMBODIMENTS OF THE INVENTION

Mirrors have been in existence for years and have been used in interior building applications such as, for example, in bathrooms, as decorations, for furniture, etc., and for exterior applications. Mirrors generally are either (a) first surface mirrors, where the mirror coating is provided between the viewer and the supporting glass substrate, or (b) second surface mirrors, where the supporting glass substrate is interposed between the viewer and the mirror coating. See, for example, U.S. Pat. Nos. 7,276,289 and 7,678,459; U.S. Publication Nos. 2006/0077580; 2007/0178316; 2008/0073203; 2008/0164173; 2010/0229853; 2011/0176212; and 2011/0176236. The entire contents of each of these patent documents are hereby incorporated herein by reference.

Interior mirrors, including home/residential mirrors, are traditionally produced via wet processing, also known as silvering, which allows a highly reflective silver layer and pleasant appearance of the reflected image. However, wet silvering is expensive, and is not environmentally friendly. Silver also is not particularly durable and, for example, is subject to corrosion when exposed to even building interior environments. Durability problems can be overcome with silver-inclusive mirrors, however, by applying one or more layers of protective paint. Yet these paints are sometimes expensive and, at a minimum, inject time delays in the process because they need to be coated and dried and sometimes re-coated and re-dried. Wet coating techniques also are "messy" and potentially hazardous to humans.

Thus, it will be appreciated that there is a need in the art for improved mirrors and/or methods of making the same. Certain embodiments of this invention solve one or more of the problems discussed above.

Certain example embodiments of this invention relate to a mirror having a reflecting layer of or including an alloy of silicon (Si) and aluminum (Al). Such a reflective layer may be used in first surface mirrors and/or second surface mirrors. The SiAl inclusive reflective layer may be sandwiched between at least first and second dielectric layers in certain example embodiments. Certain example embodiments relate to the use of a sputtering target of or including SiAl, in order to sputter-deposit the reflective layer of or including silicon aluminum on (directly or indirectly) a glass substrate, in making a mirror. Heat formable mirrors may also benefit from the use of sputter-deposited SiAl inclusive reflective layers, which material has been found to sustain little or no mechanical damage or optical change during thermal glass bending, even at some small curvature radii. Thus, example advantages of SiAl mirrors include high mechanical durability, thermal temperability (possibly without the need for additional protective overcoat(s)), thermal bendability without cracking, low cost, and environmental stability.

In certain example embodiments of this invention, there is provided a mirror comprising: a glass substrate; a metallic or substantially metallic reflective layer comprising silicon aluminum provided on the glass substrate; the metallic or substantially metallic reflective layer comprising silicon aluminum being located between at least first second dielectric layers, and wherein the first dielectric layer is located between at least the glass substrate and the metallic or substantially metallic reflective layer comprising silicon aluminum; and wherein the layer comprising silicon aluminum comprises, on a weight basis, more silicon than aluminum.

In certain example embodiments, the layer of or including silicon aluminum may comprise, on a weight basis, from 70-99.98% silicon and from 0.02-30% aluminum, more preferably from 75-99% silicon and from 1-25% aluminum, and still more preferably from 85-98% silicon and from 2-15% aluminum.

DETAILED DESCRIPTION OF EXAMPLE EMBODIMENTS OF THE INVENTION

Figure 1:
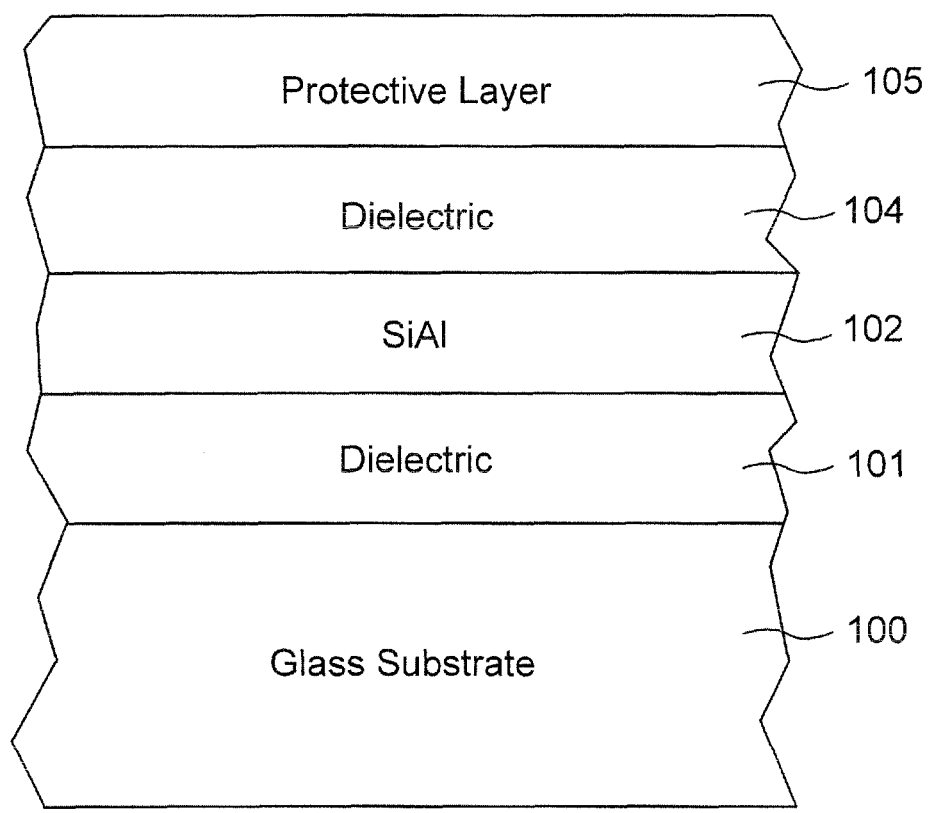
FIG. 1 is a cross sectional view of a mirror in accordance with certain example embodiments of this invention.

Referring now more particularly to the drawings in which reference numerals indicate like parts/materials throughout the several views. Mirrors according to example embodiments of this invention may be flat or bent in different instances, and may or may not be heat treated (e.g., thermally tempered and/or thermally bent). In certain example instances, such mirrors may be used in interior residential, commercial, appliance, furniture, and/or other applications.

Figures 2, 3:
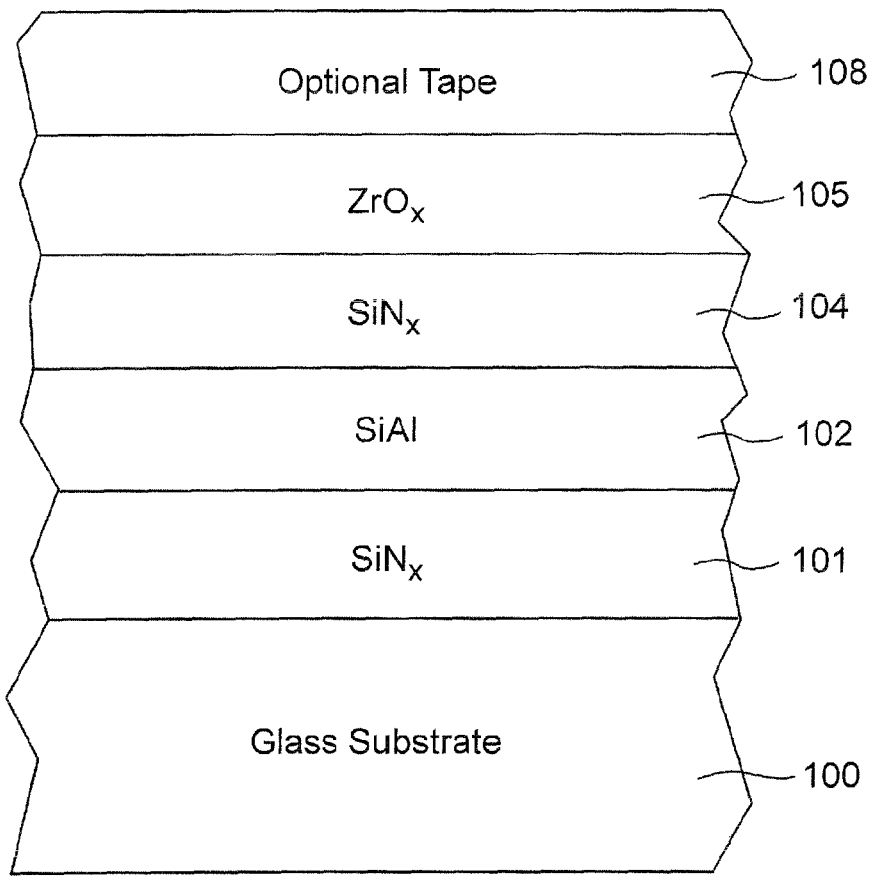
FIG. 2 is a cross sectional view of an example mirror according to an example embodiment of this invention.
FIG. 3 is a chart identifying optical characteristics of a mirror made in accordance with an example as shown in FIG. 2.

Referring to FIGS. 1-2, certain example embodiments of this invention relate to a mirror having a reflecting layer 102 of or including an alloy of silicon (Si) and aluminum (Al) which provides mirrorish reflectance. Such mirrors may be used as first surface mirrors and/or second surface mirrors. For second surface mirrors, an optional protective tape or paint layer 108 may be provided as shown in FIG. 2. Certain example embodiments relate to the use of a sputtering target of or including SiAl in order to sputter-deposit a reflective layer 102 of or including silicon aluminum on (directly or indirectly) a glass substrate 100, in making first or second surface mirrors. While the visible reflectance levels of SiAl are not as high as those of Ag and Al reflective layers in mirrors, SiAl reflective layers 102 can achieve sufficient reflectance levels for applications such as interior/residential mirrors, and may be durable and comparatively inexpensive. Moreover, SiAl mirrors may be used for a number of applications where it is desired for the reflective layer to be semi-transparent in the visible spectral range and highly reflective in the mid-IR spectral region, such as mirrors for commercial appliances such as refrigerators with partially transparent flat or curved doors/panels, funhouse mirrors, basis for astronomical mirrors in a first-surface configuration (with additional reflective layers provided, in addition to the SiAl layer(s)), and so forth. Heat formable mirrors may also benefit from the use of sputter-deposited SiAl inclusive reflective layers, which material has been found to sustain little or no mechanical damage or optical change during thermal glass bending, even at some small curvature radii. Accordingly, the mirrors shown in FIGS. 1-2 may be either flat mirrors, or may be heat-bent mirrors where the glass substrate 100 is thermally bent after the SiAl layer 102 has been sputter-deposited thereon. Thus, advantages of example SiAl mirrors include high mechanical durability, thermal temperability (possibly without the need for additional protective overcoat(s)), thermal bendability without cracking, low cost, and environmental stability. The SiAl inclusive reflective layer 102 may be provided between at least first and second dielectric layers 101 and 104 (e.g., of or including silicon nitride and/or silicon oxynitride, and/or other suitable material) in example embodiments. Optionally, transparent dielectric protective layer 105 and/or a permanent protective film (PPF) or paint 108 may be applied on the substrate 100 over the reflective layer 102 in any of the FIG. 1-2 embodiments, for added overall durability. For example, PPF 108 (e.g., in the form of a tape) may be applied in solid form in certain example embodiments. And while paint may be provided on mirrors according to example embodiments of this invention, such protective paint is not needed in many applications. Reflected images from mirrors according to example embodiments of this inventions may have a brown tint.

FIG. 1 is a cross-sectional view of a mirror (first surface mirror or second surface mirror) in accordance with example embodiments of this invention. As shown in FIG. 1, a glass substrate 100 supports a mirror coating including dielectric layer 101, reflective/mirror layer 102 of or including silicon aluminum (e.g., SiAl), and dielectric layer 104. Dielectric layer 101 may be of or include any of silicon nitride (e.g., $Si_3N_4$), silicon oxide (e.g., $SiO_2$), silicon oxynitride, aluminum nitride, aluminum oxynitride, aluminum oxide, and/or titanium nitride. And dielectric layer 104 may be of or include any of silicon nitride (e.g., $Si_3N_4$), silicon oxide (e.g., $SiO_2$), silicon oxynitride, aluminum nitride, aluminum oxynitride, aluminum oxide, and/or titanium nitride. Silicon-inclusive dielectric materials, such as silicon oxide, silicon nitride, and/or silicon oxynitride, for layers 101 and 104 may or may not be doped with aluminum such as from about 1-8% aluminum in certain example embodiments. The mirror coating may optionally include transparent dielectric layer 105 (e.g., of or including zirconium oxide or other suitable material) and/or a PPF layer 108 of tape or the like. Layers 101, 102, 104 and 105 may be sputter-deposited on the substrate 100. Metallic or substantially metallic SiAl based reflective layer 102 may be sputter-deposited on glass substrate 100, via one or more SiAl sputtering target(s) in an atmosphere of or including inert gas such as argon gas. In certain example embodiments, the SiAl layer 102 is sputter-deposited, via at least one SiAl target, in an argon gas atmosphere that includes little or no oxygen or nitrogen gas. One SiAl layer 102 is provided in the mirror in the illustrated embodiments herein, although it is possible that multiple SiAl layers may be provided. Optionally, a paint or PPF film 108 may also be provided on the substrate 100 as shown in FIG. 1, over at least the reflective layer 102.

SiAl layer 102 may contain, on a weight % basis, from 70-99.98% Si (more preferably from 75-99.5%, even more preferably from 75-99%, and most preferably from 85-98% Si), and from 0.02-30% Al (more preferably from 0.2-25%, even more preferably from 1-25%, and most preferably from 2-15% Al). It has been found that too much Al harms the stability of the Si in the layer 102, so the above ranges of Si and Al are preferred for layer 102 in example embodiments. Adding the Al to the Si is advantageous in that it increases the reflectance of the layer 102 compared to if the layer 102 was only Si. It will be appreciated that amounts (e.g., small amounts) of other material(s), such as nitrogen and/or oxygen, may also be present in SiAl layer 102 in certain example embodiments of this invention.

Glass substrate 100 may be soda-lime-silica based glass, and may be from about 1-10 mm thick, more preferably from about 2-6 mm thick, in example embodiments of this invention. SiAl layer 102 may be from about 50-1,000 Å (angstroms) thick, more preferably from about 100-500 Å thick, more preferably from about 125-350 Å thick, even more preferably from about 130-300 Å thick, and most preferably from about 140-250 Å thick. It has been found that reflective properties of layer 102 deteriorate if the SiAl layer 102 is thicker than 300 Å or is thinner than 130 Å. Thus, it has surprisingly been found that the best reflectance is achieved from SiAl layer 102 when the SiAl layer 102 is from about 130-300 Å thick, and most preferably from about 140-250 Å thick.

Transparent dielectric layer 101 and 104 may be of or include any of silicon nitride (e.g., $Si_3N_4$), silicon oxide (e.g., $SiO_2$), silicon oxynitride, aluminum nitride, aluminum oxynitride, aluminum oxide, titanium nitride, or other suitable material. In example embodiments, dielectric layer 101 may be thicker (e.g., at least 20 angstroms thicker, more preferably at least about 30 angstroms thicker) than dielectric layer 104. In example embodiments, dielectric layer 101 may also be thicker (e.g., at least 20 angstroms thicker, more preferably at least about 30 angstroms thicker, and most preferably at least 50 angstroms thicker) than optional protective dielectric layer 105. Inner dielectric layer 101 may be from about 50-500 Å (angstroms) thick, more preferably from about 75-300 Å thick, and most preferably from about 100-200 Å thick, with an example thickness being about 150 Å. Outer dielectric layer 104 may be from about 40-500 Å (angstroms) thick, more preferably from about 50-200 Å thick, and most preferably from about 70-140 Å thick, with an example thickness being, about 100 Å.

Sputter-deposited transparent protective dielectric layer 105 (e.g., of or including one or more of zirconium oxide, zirconium oxynitride, and/or zirconium silicon oxynitride), if provided, may be from about 30-500 Å thick, more preferably from about 40-120 Å thick in certain example embodiments, with an example thickness being about 60 Å.

In example embodiments, SiAl layer 102 has a visible transmission of from about 10-36% (more preferably from about 12-32%), and a visible reflectance of from about 40-75% (more preferably from about 43-65%). Thus, the mirrors shown in FIGS. 1-2, before and/or after any optional heat treatment, may have a visible transmission ($T_{vis}$, Y, or TrY) of from about 5-36%, more preferably from about 10-34%, more preferably from about 12-32%. And the mirrors shown in FIGS. 1-2, before and/or after any optional heat treatment, may have a visible film side reflectance (Rf or RfY) of from about 45-75%, more preferably from about 48-65%; and a visible glass side reflectance (Rg or RgY) of from about 40-70%, more preferably from about 42-55%, and most preferably from about 44-53%.

FIG. 2 is a cross sectional view of an example first or second surface mirror according to an example embodiment of this invention. Note that PPF or paint 108 is typically not included in second surface mirrors. It will be appreciated that the mirror coating in FIG. 2 may be the same as shown and described with respect to FIG. 1, with respect to thicknesses, optics, materials and so forth. Layers 105 and 108 are optional. In the example shown in FIG. 2, the inner and outer transparent dielectric layers 101 and 104 are of or include silicon nitride, which may or may not be doped with aluminum or the like. Layer 101 and/or layer 104 may also optionally include oxygen in certain example embodiments. Also, in the FIG. 2 example, protective dielectric layer 105 is of or includes zirconium oxide. Optionally, when provided, protective layer/film 108 may be of PPF (e.g., polymer based tape) or paint.

Example

An example mirror, similar to FIG. 2, was made as follows and included the following layers moving away from the glass substrate 100:
   Glass substrate 100 (4 mm thick clear glass)
   Silicon nitride 101 (150 Å thick)
   SiAl 102 (132 Å thick)
   Silicon nitride 104 (100 Å thick)
   Zirconium oxide 105 (60 Å thick)

FIG. 3 is a table setting forth the optics, before and after heat treatment (HT), for the above-identified example mirror. The left-hand column of values were measured as-coated (AC) before HT, and the right-hand column of values were measured after HT. The HT was sufficient for thermal bending and/or tempering, and was at temperature(s) of at least 580 degrees C. For example, FIG. 3 illustrates that the example mirror had: glass side visible reflectance (RgY) of 44.2% before HT, and 49.2% after HT; glass side reflective a* color of −2.2 before HT and −2.9 after HT; and glass side reflective b* color of +2.1 before HT and +1.7 after HT. And FIG. 3 illustrates that the example mirror had: visible transmission (TrY) of 24.9% before HT, and 30.7% after HT; transmissive a* color of +2.5 before HT and +3.5 after HT; and transmissive b* color of +12.3 before HT and +17.1 after HT. Film side visible reflective values are also set forth in FIG. 3 for the example coating. Thus, it will be appreciated that while the mirror had some transmission it also had significant reflectance for mirror applications.

In the FIG. 1-2 embodiments, layers 101, 102, 104 and 105 are preferably deposited via sputtering, although they could be deposited in other suitable manners. For example, the SiAl layer 102 may be deposited on glass substrate 100 in any suitable manner, such as via magnetron DC or RF sputtering. For example, the sputtering of SiAl inclusive layer 102 may be done at room or elevated temperature, in a pure or substantially pure argon gas atmosphere, for example at about 2-20 mTorr (e.g., at pressure of about 3 mTorr).

Certain example embodiments may optionally incorporate a permanent protective film (PPF) 108, e.g., polymer inclusive film, with high adhesion levels, good chemical resistance, and/or excellent environmental durability. The protective film may be resistant to delamination from moisture penetration and/or the use of asphalitic based adhesives applied to the exterior surface of the protective film. Adhesive strengths of the protective films may be greater than or equal to 150 cN/20 mm wide strip, more preferably 275 cN/20 mm wide strip, as measured in a tape removal test. For instance, certain example embodiments may have an adhesive strength of 200-500 cN/20 mm wide strip, more preferably 200-300 cN/20 mm wide strip. In certain example embodiments, the PPF may be thin, e.g., having a thickness of <200 microns, and sometimes about 40-100 microns in thickness. Peel strength may be increased through the incorporation of additional cross-linking polymers in certain example embodiments. Example protective films 108 from Nitto-Denko include: SPV-9310, SPV-9320, SPV-30800, SPV 5057 A5, and SPV 5057 A7. Other manufacturers of similar preferred protective films include Permacel, Tessa Tapes, B&K Films, and Novacell. These plastic films come in a wide variety of opacities and colors.

While a layer, layer system, coating, or the like, may be said to be "on" or "supported by" a substrate, layer, layer system, coating, or the like, other layer(s) may be provided therebetween. Thus, for example, the coatings or layers described above may be considered "on" and "supported by" the substrate and/or other coatings or layers even if other layer(s) are provided therebetween.

In example embodiments of this invention, there is provided a mirror comprising: a glass substrate; a metallic or substantially metallic reflective layer comprising silicon aluminum provided on the glass substrate; the metallic or substantially metallic reflective layer comprising silicon aluminum being located between at least first second dielectric layers, and wherein the first dielectric layer is located between at least the glass substrate and the metallic or substantially metallic reflective layer comprising silicon aluminum; and wherein the layer comprising silicon aluminum comprises, on a weight basis, more silicon than aluminum.

In the mirror of the immediately preceding paragraph, the layer comprising silicon aluminum may consist essentially of silicon aluminum.

In the mirror of any of the preceding two paragraphs, the layer comprising silicon aluminum may comprise, on a weight basis, from 70-99.98% silicon and from 0.02-30% aluminum, more preferably from 75-99% silicon and from 1-25% aluminum, and still more preferably from 85-98% silicon and from 2-15% aluminum.

In the mirror of any of the preceding three paragraphs, the metallic or substantially metallic reflective layer comprising silicon aluminum may directly contact the first and/or second dielectric layer(s).

In the mirror of any of the preceding four paragraphs, the layer comprising silicon aluminum may be from 100-500 Å thick, more preferably from 130-300 Å thick.

In the mirror of any of the preceding five paragraphs, the mirror may have a visible transmission of from about 5-36%, more preferably from about 10-34%.

In the mirror of any of the preceding six paragraphs, the mirror may have a glass side visible reflectance of from about 42-55%.

In the mirror of any of the preceding seven paragraphs, the mirror may have a film side visible reflectance of from about 48-65%.

In the mirror of any of the preceding eight paragraphs, the layer comprising silicon aluminum may be a sputter-deposited layer.

In the mirror of any of the preceding nine paragraphs, the first dielectric layer may be of or include one or more of silicon nitride, silicon oxide, and/or silicon oxynitride.

In the mirror of any of the preceding ten paragraphs, the second dielectric layer may be of or include one or more of silicon nitride, silicon oxide, and/or silicon oxynitride.

The mirror of any of the preceding eleven paragraphs may further comprise a layer comprising zirconium oxide, wherein the second dielectric layer is located between and directly contacting the layer comprising zirconium oxide and the layer comprising silicon aluminum.

The mirror of any of the preceding twelve paragraphs may further comprise a polymer inclusive film, the second dielectric layer being located between at least the layer comprising silicon aluminum and the polymer inclusive film.

The mirror of any of the preceding thirteen paragraphs may be a first surface mirror, or a second surface mirror.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mirror, comprising:
a glass substrate;
a metallic or substantially metallic reflective layer comprising silicon aluminum provided on the glass substrate;
the metallic or substantially metallic reflective layer comprising silicon aluminum being located between at least first second dielectric layers, and wherein the first dielectric layer is located between at least the glass substrate and the metallic or substantially metallic reflective layer comprising silicon aluminum;
wherein the layer comprising silicon aluminum comprises, on a weight basis, more silicon than aluminum; and
a protective layer comprising zirconium oxide on the glass substrate over the reflective layer and over the first and second dielectric layers.

2. The mirror of claim 1, wherein the layer comprising silicon aluminum consists essentially of silicon aluminum.

3. The mirror of claim 1, wherein the layer comprising silicon aluminum comprises, on a weight basis, from 75-99% silicon and from 1-25% aluminum.

4. The mirror of claim 1, wherein the layer comprising silicon aluminum comprises, on a weight basis, from 85-98% silicon and from 2-15% aluminum.

5. The mirror of claim 1, wherein the metallic or substantially metallic reflective layer comprising silicon aluminum directly contacts each of the first and second dielectric layers.

6. The mirror of claim 1, wherein the layer comprising silicon aluminum is from 100-500 Å thick.

7. The mirror of claim 1, wherein the layer comprising silicon aluminum is from 130-300 Å thick.

8. The mirror of claim 1, wherein the mirror has a visible transmission of from about 5-36%.

9. The mirror of claim 1, wherein the mirror has a visible transmission of from about 10-34%.

10. The mirror of claim 1, wherein the mirror has a glass side visible reflectance of from about 42-55%.

11. The mirror of claim 1, wherein the mirror has a film side visible reflectance of from about 48-65%.

12. The mirror of claim 1, wherein the layer comprising silicon aluminum is a sputter-deposited layer.

13. The mirror of claim 1, wherein the first dielectric layer comprises silicon nitride.

14. The mirror of claim 1, wherein the second dielectric layer comprises silicon nitride.

15. The mirror of claim 1, wherein the second dielectric layer is located between and directly contacting the layer comprising zirconium oxide and the layer comprising silicon aluminum.

16. The mirror of claim 1, further comprising a polymer inclusive film, the second dielectric layer being located between at least the layer comprising silicon aluminum and the polymer inclusive film.

17. The mirror of claim 1, wherein the mirror is a first surface mirror.

18. The mirror of claim 1, wherein the mirror is a second surface mirror.

19. The mirror of claim 1, wherein the first dielectric layer and/or the second dielectric layer comprises silicon oxynitride.

20. The mirror of claim 1, wherein the first dielectric layer and/or the second dielectric layer comprises silicon oxide.

* * * * *